United States Patent [19]
Sarno

[11] 3,775,259
[45] Nov. 27, 1973

[54] ISOPRENE RECOVERY PROCESS BY PLURAL EXTRACTIVE DISTILLATIONS
[75] Inventor: Dante H. Sarno, El Cerrito, Calif.
[73] Assignee: Shell Oil Company, New York, N.Y.
[22] Filed: Aug. 26, 1971
[21] Appl. No.: 175,233

[52] U.S. Cl............. 203/54, 203/58, 203/60, 203/62, 203/65, 203/82, 203/84, 203/99, 260/681.5 R
[51] Int. Cl....... C07c 7/08, B01d 3/40, C07c 11/18
[58] Field of Search............... 260/681.5 R; 203/53, 203/54, 60, 58, 62, 74, 75, 77, 82, 99, 84

[56] References Cited
UNITED STATES PATENTS
| | | | |
|---|---|---|---|
| 3,320,138 | 5/1967 | Brandt et al. | 260/681.5 |
| 3,012,947 | 12/1961 | Kelley et al. | 260/681.5 |
| 3,230,157 | 1/1966 | Hill et al. | 260/681.5 |
| 3,496,070 | 2/1970 | Woerner | 260/681.5 |
| 3,501,550 | 3/1970 | Brandt et al. | 260/681.5 |

Primary Examiner—Wilbur L. Bascomb, Jr.
Attorney—Howard W. Haworth et al.

[57] ABSTRACT
Isoprene is recovered in high purity from a cyclopentadiene-containing $C_5$ fraction in a two-stage extractive distillation in the presence of a selective polar solvent. Substantially all of the cyclopentadiene is removed in the first or heavy ends extractive distillation zone wherein the concentration of the extractive distillation solvent is maintained at from 5 to 40 mole percent to thereby recover substantially all of the isoprene and more volatile hydrocarbons as overhead products from the zone. Isoprene is then separated from this overhead $C_5$ fraction in a second or light ends extractive distillation zone and is recovered in the fat solvent from which it is recovered in an isoprene stripping zone. A high solvent concentration is maintained in the upper section of the isoprene stripping zone and cyclopentadiene is recovered from a lower section of the zone via a side draw. The dimer content of the solvent circulating in the light ends extractive distillation zone and isoprene stripping zone is controlled by recycling a portion of the stripped solvent from the bottom of the isoprene stripping zone to the heavy ends extractive distillation zone wherein the recovered dimer is rejected in the bottoms product. Solvent is recovered from that bottoms product in a heavy ends stripping zone as a vapor side draw.

7 Claims, 1 Drawing Figure

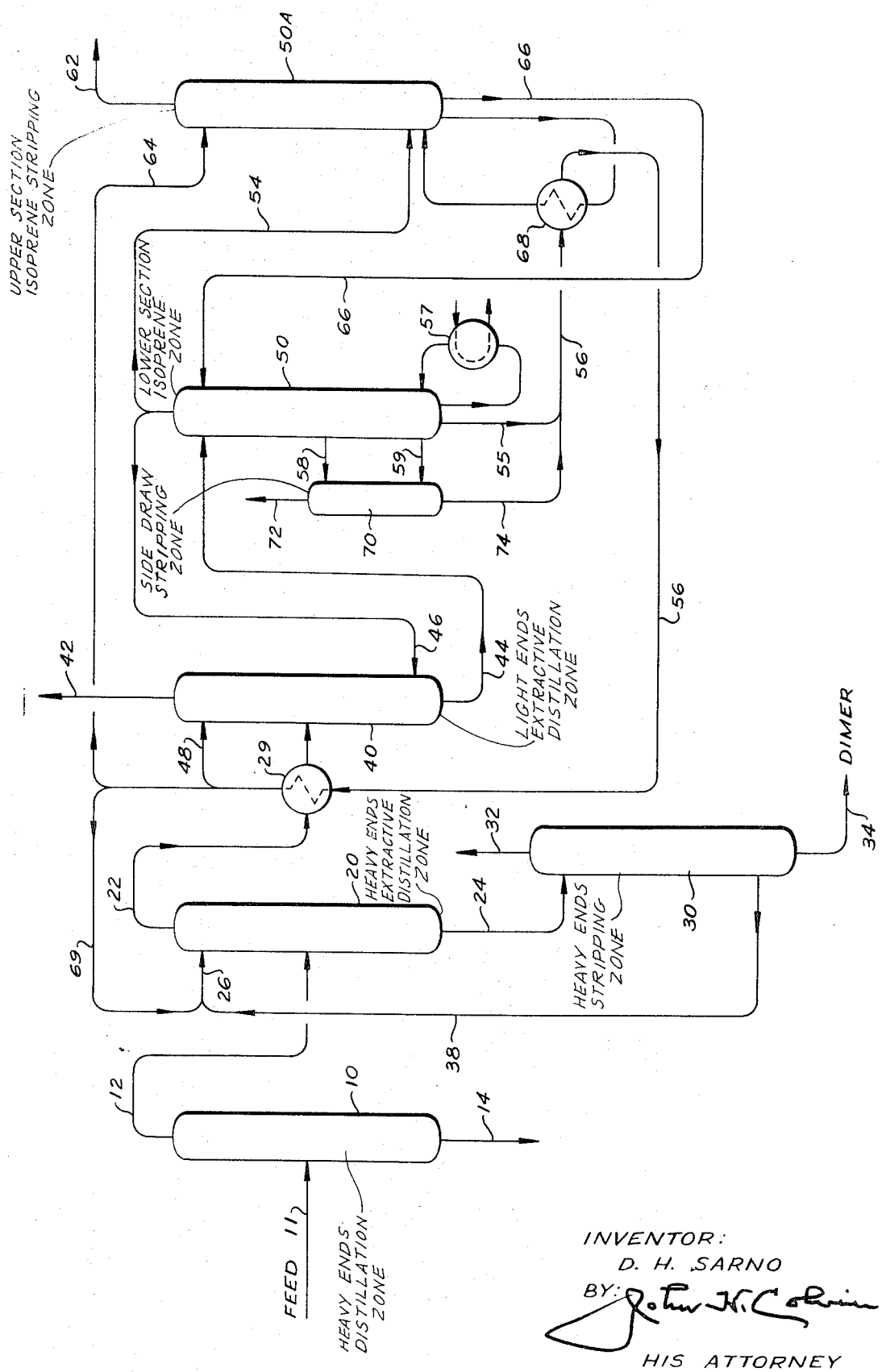

ISOPRENE RECOVERY PROCESS BY PLURAL EXTRACTIVE DISTILLATIONS

BACKGROUND OF THE INVENTION

Isoprene is a valuable substance in the preparation of synthetic rubber, such as butyl rubber and polyisoprene rubber, which is produced by the catalytic polymerization of isoprene. Typical methods of producing isoprene monomer include dehydrogenation of amylenes or isopentanes or recovering isoprene from a $C_5$ fraction obtained as a by-product in the production of ethylene from naphtha cracking.

The $C_5$ fraction obtained as a by-product from naphtha cracking operations generally contain large amounts of cyclopentadiene. Since isoprene and cyclopentadiene have similar boiling points, it is difficult to separate the two components by conventional distillation techniques. Although valuable as an intermediate for many organic products, cyclopentadiene in an isoprene-containing $C_5$ fraction is undesirable. In commercial polymerization processes for producing polyisoprene, cyclopentadiene acts as a catalyst poison. For this reason isoprene monomer specifications typically allow no more than 3–5 ppm cyclopentadiene as impurity. Also, at the elevated temperatures of typical separation processes cyclopentadiene reacts with isoprene, pentadiene and other reactive compounds, particularly unsaturated compounds, to form a number of adducts which are typically high molecular weight polymerization products. Such products are troublesome as fouling deposits and represent a loss of isoprene product.

In order to recover isoprene from a $C_5$ fraction, especially one containing substantial quantities of cyclopentadiene, several processes have been proposed, none of which is entirely satisfactory. Ordinary fractional distillation is not effective for recovering high purity isoprene from such a $C_5$ fraction because of the closeness of the boiling points of several of the components in the fraction. It would be necessary to employ a distillation column having a large number of theoretical plates and with a considerable amount of reflux in order to separate isoprene at sufficient purity to be practicable. Such a design in uneconomical.

Several hitherto known industrial methods for separating cyclopentadiene from $C_5$ fractions are based on the known dimerization of cyclopentadiene at elevated temperatures. For example, the $C_5$ fraction is heated for a certain period of time to a temperature in the range from about 80° C to about 120° C after which period the dimer is separated from the mixture. An example of one of the many processes involving dimerization of cyclopentadiene is disclosed in U.S. Pat. No. 3,436,437. However, since dimerization proceeds slowly, long residence times (up to 12 hours) in the dimerization zone are necessary and the zone must consequently have a large capacity. Moreover, the the dimer fraction will additionally contain a considerable amount of isoprene in chemically combined form. This dimer, co-dimer or polymer, as the case may be, represents a loss of product as it is not readily recovered by thermal cracking as can cyclopentadiene.

Another process proposed for the recovery of isoprene from cyclopentadiene-containing mixtures is extractive distillation. In the presence of a suitable polar solvent, cyclopentadiene is slightly less volatile than isoprene which in turn is less volatile than the other $C_5$ unsaturates present in the mixture. Therefore, it is possible by a series of extractive distillations to recover isoprene from the other hydrocarbons present in the mixture. There have been devised several processes for recovering isoprene free from cyclopentadiene from a $C_5$ unsaturate mixture.

In one of the many two-stage extractive distillation processes for recovering isoprene, the $C_5$-fraction is initially subjected to an extractive distillation wherein isoprene and cyclopentadiene are recovered in the fat solvent. The pentenes and pentanes are rejected as a distillate product. The fat solvent is then stripped of isoprene and cyclopentadiene and the distillate is subjected to a fractionation to produce an isoprene-rich stream containing a lesser quantity of cyclopentadiene. This mixture is then subjected to a second extractive distillation to produce a high purity isoprene distillate product. Such a process is described in U.S. Pat. No. 3,510,405. However, recovery of both isoprene and cyclopentadiene in the initial extractive distillation requires large amounts of solvent and present difficult clean-up problems.

In another variation of the two-stage extractive distillation process such as, for example, that disclosed in published Netherlands application No.6816023, the isoprene-cyclopentadiene-containing $C_5$ fraction is subjected to an extractive distillation under such conditions that isoprene and the more volatile hydrocarbons are recovered as a distillate product while the major portion of the cyclopentadiene is removed together with the solvent as the bottoms product. However, not all of the cyclopentadiene is removed in the first extractive distillation and the process does not provide for the problems of cyclopentadiene contamination of the isoprene product or with the build-up of dicyclopentadiene in the circulating solvent.

It would be an advantage to provide an improved method by which isoprene could be recovered substantially free from cyclopentadiene contamination. It would also be an advantage to provide an improved extractive distillation method for recovering isoprene from cyclopentadiene-containing feedstocks in which cyclopentadiene and its dimer are effectively removed from the circulating extractive distillation solvent.

SUMMARY OF THE INVENTION

The above advantages are obtained in an improved two-stage extractive distillation process wherein cyclopentadiene is substantially completely removed from the $C_5$-fraction in a first, or heavy ends, extractive distillation zone and isoprene is recovered from the resulting distillate product in a second, or light ends, extractive distillation zone. By maintaining a sufficiently high concentration of relatively clean solvent in the upper section of a stripping zone from which isoprene is recovered, it is possible to obtain a crude isoprene distillate product with no more than a few parts per million cyclopentadiene as impurity. Stripped solvent from the bottom of the isoprene stripping zone, a portion of which must be injected into the top of the stripping zone to provide this high solvent concentration, is maintained relatively free of cyclopentadiene by withdrawing via a side draw a cyclopentadiene-containing slip stream from a location in the isoprene stripping zone where the cyclopentadiene content is relatively concentrated. Dicyclopentadiene (dimer) and other heavy ends are prevented from accumulating in the circulating solvent by continuously transferring a slip stream of the stripped solvent from the bottom of the isoprene stripping zone to the heavy ends extractive distillation zone wherein the dimer and other heavy ends are ultimately rejected from the system as the bottoms product of the heavy ends stripping zone. Solvent with a low dimer content is recovered from the heavy ends stripping zone as a vapor side draw and is circulated to the top of the heavy ends extractive distillation zone.

BRIEF DESCRIPTION OF THE FIGURE

The invention will be illustrated by reference to the attached FIGURE which represents a schematic flow diagram of a preferred embodiment of the invention. In this particular embodiment isoprene is separated and recovered from a $C_5$-fraction obtained as a by-product of a naphtha-cracking process for ethylene production.

DESCRIPTION OF THE PREFERRED EMBODIMENTS

In accordance with the present invention a hydrocarbon fraction containing isoprene, substantial amounts of cyclopentadiene and other $C_5$-hydrocarbons is introduced as a vapor into an intermediate section of an initial or heavy ends distillation zone wherein the mixture is fractionated to remove the major proportion of any heavy ends. A $C_5$-fraction obtained as a by-product from a naphtha cracking operation contains considerable quantities of cyclopentadiene, for example up to 40% or more, as well as other heavy ends. Partial cyclopentadiene removal is effected in the heavy ends distillation zone where a substantial portion of the cyclopentadiene is converted to dimer and is removed as bottoms product. The extent to which the cyclopentadiene is removed will, of course, depend upon several factors such as operating temperature and residence time in the distillation zone. For example, with a $C_5$-fraction from a naphtha cracking operation which contains more than 40% cyclopentadiene, up to 50% or more is typically removed as dimer in this operation where operated at a temperature of from 125° F to 145° F and an overhead pressure of about 25 psig. In a modification of the instant invention the heavy ends distillation step is omitted and the $C_5$-fraction is fed directly to the first extractive distillation zone.

The overhead product from the heavy ends distillation zone, if such a zone is employed, is introduced into an intermediate section of the first, or heavy ends, extractive distillation zone wherein the mixture is distilled in the presence of a polar solvent. The solvent is continuously introduced into the top of the heavy ends extractive distillation zone at a rate such that sufficient solvent is flowing countercurrently to rising hydrocarbon vapors to effect the removal of essentially all of the cyclopentadiene as bottoms product while recovering essentially all of the isoprene as an overhead distillate product. While the precise amount of solvent which must be present to achieve this result will depend upon the solvent selected, the feed composition and operating conditions, $C_5$-fractions containing up to 30 mole % cyclopentadiene typically require that the distillation be carried out in the presence of relatively low amounts of solvent, e.g., between 5 and 40 mole % solvent, on the trays in the extractive distillation zone. Excessive solvent concentrations should be avoided because of increased energy demands and cost of solvent cleanup and the higher bottoms temperatures which are required.

The polar solvent which is used in the extractive distillation is selected for its ability to effect a difference in the relative volatilities among the components to be distilled with the result that the desired separation will be achieved. Solvents which may be used in the process of this invention include acetonitrile, acetone, furfural, dimethylformamide, dioxane, phenol and N-methylpyrrolidone, or their aqueous admixtures.

The thermal energy required for the extractive distillation is conveniently supplied via a reboiler attached to the base of the extractive distillation zone. Typically, the heavy ends extractive distillation zone operates with an overhead pressure of approximately 30 psia and an overhead temperature of approximately 130° F. The corresponding bottoms temperature at these operating conditions is in the range of from 180°– 225° F.

At the proper operating conditions and solvent concentration, the isoprene and more volatile hydrocarbons are recovered as a distillate product and typically contain less than 0.2 wt % cyclopentadiene as impurity relative to isoprene.

The overhead distillate product from the heavy ends extractive distillation zone containing essentially isoprene, pentenes, pentanes and a small amount of cyclopentadiene is introduced into an intermediate section of the second, or light ends, extractive distillation zone. Solvent is continuously introduced into the top of the zone to provide the relatively high solvent concentration required to recover essentially all of the isoprene as a bottoms product while recovering the pentanes, pentenes and light pentadienes as an overhead distillate. Solvent concentrations in the zone in the range of about 70 – 90 mole % are typical. The light ends extractive distillation zone is generally operated at as low a pressure as possible to avoid unusually high temperatures and high energy requirements. An overhead operating pressure of approximately 25 psia is typical, although higher or lower pressures can be utilized. Subatmospheric pressures, however, should be avoided because of the problems incident to the leakage of oxygen into the system. At an overhead pressure of 25 psia the overhead temperature in the extractive distillation zone is approximately 120° F and the bottoms temperature is approximately 190° F. The thermal energy required for the extractive distillation is conveniently supplied by recycling a portion of the vapor obtained from an intermediate point in the second stripping zone to the bottom of the extractive distillation zone.

The isoprene together with the fat solvent recovered from the second or light ends extractive distillation zone is introduced into an isoprene stripping zone wherein the isoprene is stripped from the solvent and is recovered as a distillate product. Typical maximum temperatures in the stripping zone are in the range of 240°– 260° F and the overhead pressure in the stripping zone is approximately 25 psia. However, in addition to isoprene, the fat solvent also contain small amounts of cyclopentadiene, isopropenyl acetylene, cis- and trans-1,3-pendadiene and other $C_5$ unsaturates. Cyclopentadiene is particularly troublesome because of the very low tolerances for this impurity in isoprene monomer. To recover isoprene essentially free from cyclopentadiene, it is necessary to add solvent to the upper section of the isoprene stripping zone. Although the amount of solvent which must be added will depend upon the cyclopentadiene concentration in the system, solvent concentrations in the upper section of up to 55 mole % are typical. At this solvent level there is an almost complete recovery of the cyclopentadiene at a lower part of the zone. In contrast with other processes, the process of the instant invention provides for cyclopentadiene removal from the isoprene stripping zone by means of a side draw. At a point located in a lower section of the isoprene stripping zone where the cyclopentadiene is relatively concentrated, a small stream containing essentially solvent, cyclopentadiene and other acetylenes and dienes is withdrawn, thereby providing an outlet for cyclopentadiene other than overhead and bottoms product. This side draw is conveniently recycled to the upper section of the heavy ends extractive distillation zone in order to recover the contained solvent.

In one modification of the instant invention the cyclopentadiene-containing side draw is introduced into the upper section of a side draw stripper operated at a lower pressure than that of the stripping zone in order to recover the contained solvent. Thermal energy is supplied to the bottom of the side draw stripper to strip the cyclopentadiene and other volatile hydrocarbons from the solvent. These compounds are removed from the side draw stripper as an overhead vapor product. The stripped solvent is returned to the bottom of the isoprene stripping zone. The thermal energy is generally supplied by a reboiler attached to the base of the side draw stripper; however, in what is believed to be a novel design a vapor stream from a lower section of the stripping zone is introduced into the bottom of the side draw stripper. This vapor, which is at a higher temperature than the feed to the side draw stripper, supplies the heat necessary for the sripping operation. In this manner the requirement of an independent reboiler for the side stripper is avoided.

The isoprene stripping zone is conveniently composed of two columns operated in series. In one modification a portion of the overhead vapor from the lower or first column is recycled to the bottom of the light ends extractive distillation zone to provide the thermal energy necessary for the separation. The remainder of the vapor is fed to the bottom of the second column of the isoprene stripping zone. The thermal energy required for the stripping operation is provided by a reboiler attached to the bottom of the stripping zone. The hot stripped solvent recovered from the bottom of the stripping zone may be utilized to exchange heat with the bottoms of the upper or second column of the isoprene stripping zone, to provide heat to vaporize the $C_5$-fraction being fed to the second or light ends extractive distillation zone before being recycled to the top of the extractive distillation zone and/or to vaporize plant feed to the first column.

Not all of the cyclopentadiene contained in the feed to the second or light ends extractive distillation zone is removed via the side draw. During processing in the extractive distillation and stripping zones a portion of the cyclopentadiene undergoes dimerization at the elevated temperature. Also formed are co-dimers of cyclopentadiene and isoprene as well as other polymerized materials. Unless removed the dimers and other heavy materials would continue to accumulate in the circulating solvent, rendering it less effective in achieving the desired separations. In contrast with other processes which provide for less efficient and more expensive methods, the process of the present invention removes dimer by recycling a slip stream of the stripped solvent from the bottom of the isoprene stripping zone to the first or heavy ends extractive distillation zone. The heavy ends contained in this stream are ultimately recovered from the system in the bottoms product of the heavy ends extractive distillation zone. In this manner the dimer content of the circulating solvent is maintained at the desired level.

A heavy ends stripping zone is generally employed to recover the solvent contained in the bottoms stream from the heavy ends extractive distillation zone. However, in some instances it is desirable to maintain in the heavy ends extractive distillation zone a very low solvent concentration, e.g., less than 10 mole % and at the same time eliminate the heavy ends stripping zone. Where such a stripping zone is employed, the solvent is conveniently recovered as a vapor side draw at a location in the zone such that the dimer concentration is less than 2 mole percent.

The crude isoprene product obtained as a distillate product from the isoprene stripping zone is generally subjected to additional fractionation in order to remove the small amounts of light ends and heavy materials. High purity isoprene monomer containing less than 5 ppm cyclopentadiene as impurity is obtained as a final distillate product.

Now reference will be made to the attached FIGURE which represents a schematic flow diagram of a preferred embodiment of the present invention wherein isoprene is recovered from a $C_5$-fraction containing considerable quantities of cyclopentadiene. The extractive distillation solvent employed is aqueous acetonitrile. It is to be understood that the Figure is only a schematic representation of the process and does not purport to show the conventional instrumentation and valving present in a typical commercial plant.

A $C_5$-fraction obtained as a by-product of a naphtha cracking process for ethylene production carried by Line 11 to an intermediate portion of a heavy ends distillation zone 10. The zone operates at a top pressure of approximately 40 psia and with an overhead temperature of approximately 155° F. A hydrocarbon stream containing heavy ends and cyclopentadiene dimer is removed as a bottoms product via Line 14. A stream containing isoprene, cyclopentadiene and other $C_5$ saturates and unsaturates is recovered as an overhead product via Line 12. The thermal energy required for the distillation is supplied via a reboiler located at the base of the column.

The $C_5$-fraction, relatively free of heavy ends is carried via Line 12 to an intermediate portion of the first or heavy ends extractive distillation zone 20, wherein it is distilled in the presence of aqueous acetonitrile solvent. The column operates at a top pressure of approximately 30 psia. The acetonitrile solvent containing up to 20 mole % water enters a top portion of the extractive distillation zone 20 via Line 26 at a temperature of approximately 130° F. A hydrocarbon stream containing $C_5$ olefins, diolefins and saturates and which is substantially free of cyclopentadiene is removed as an overhead product via Line 22. A fat solvent containing essentially cyclopentadiene, dicyclopentadiene and acetylenes is removed from the base of the extractive distillation column 20 via Line 24. The thermal energy required for the extractive distillation is provided by means of reboiler attached to the zone.

The overhead distillate from the heavy ends extractive distillation zone 20 containing essentially all of the isoprene is carried via Line 22 through a feed vaporizer 29 to the intermediate portion of the second or light ends extractive distillation zone 40. The mixture is again distilled in the presence of aqueous acetonitrile solvent which is continuously injected into the top of the zone via Line 48. An overhead distillate containing essentially pentenes and pentanes is recovered via Line 42, whereas isoprene is recovered in the fat solvent along with a small quantity of cyclopentadiene and acetylenic materials via Line 44. A hydrocarbon rich vapor stream from the top of the lower section of the isoprene stripping zone 50 is carried via Line 46 to the bottom of the second extractive distillation zone 40 where it provides the thermal energy necessary for distillation.

The fat solvent from the bottom of the light ends extractive distillation zone 40 is carried via Line 44 to the top of the lower section of the isoprene stripping zone 50. In this zone thermal energy is added via reboiler 57 to produce an overhead vapor product, a portion of which is recycled via Line 46 to the bottom of the light ends extraction distillation zone 40. The remaining portion is carried via Line 54 to the upper section of the isoprene stripping zone 50A. A solvent-rich liquid stream is returned from the bottom of the upper section of the isoprene stripping zone 50A via Line 66 to the top of the lower section wherein the contained hydrocarbons are recovered.

The small quantity of cyclopentadiene contained in the fat solvent is concentrated in the lower section of the isoprene stripping zone 50. At a point in the stripping zone where the cyclopentadiene is relatively concentrated a liquid slip-stream is removed via Line 58 and is introduced into the upper section of a side draw stripper 70. Hot vapor from a point lower in the isoprene stripping zone 50 is carried via Line 59 into the bottom of the side draw stripper 70 to provide the thermal energy required to strip the cyclopentadiene and other light materials from the solvent. These hydrocarbons are removed from the system via Line 72. The stripped solvent is recovered in the bottom of the side draw stripper 70 and is combined via Line 74 with the stripped solvent stream obtained from the bottom of the lower section of the isoprene stripping zone 50 in Line 56.

This hot stripped solvent is carried via Line 56 to a heat exchanger 68 where it exchanges heat with the bottoms of the upper section of the isoprene stripping zone 50A and is then transferred to feed vaporizer 29 where it exchanges heat with the feed to the light ends extractive distillation unit 40. After further cooling to approximately 130°F the solvent is split into several portions. One portion is carried via line 64 to the upper section of the isoprene stripping zone 50A where it is used to provide a predetermined solvent concentration in that zone. A small slip-stream is continuously removed via Line 69 to the top of the heavy ends extractive distillaton zone 30 to thereby control the dimer content of the circulating solvent. The remaining and largest portion is carried via Line 48 to the top of the light ends extractive distillation zone 40 for re-use.

The fat solvent from the bottom of the heavy ends extractive distillation zone 20, which contains cyclopentadiene, dimer, and other heavy ends, is carried via Line 24 to an intermediate portion of the heavy ends stripping zone 30. By means of thermal energy supplied via a reboiler the cyclopentadiene and lighter hydrocarbons are removed as an overhead distillate product via Line 32. Since the solvent is more volatile than the dimer and heavy ends, solvent is recovered as a vapor side draw via Line 38 and is returned to the top of the heavy ends extractive distillation zone 20. Dimer is rejected as bottoms product from the stripping zone via Line 34 which is combined with the overhead product in Line 32 and is water-washed to recover entrained solvent.

The overhead distillate from the isoprene stripping zone 50A is fed, if necessary, via Line 62 to a series of fractionators where residual light and heavy ends are removed from the final isoprene product.

I claim as my invention:

1. In the process of recovering isoprene from a $C_5$-fraction containing cyclopentadiene, isoprene and other $C_5$ unsaturates by a two-stage extractive distillation of the mixture in the presence of a selective polar solvent wherein cyclopentadiene is extractively distilled as the bottom product in the first or heavy ends extractive distillation zone with the isoprene and more volatile $C_5$ unsaturates being recovered as an overhead product and isoprene is thereafter recovered from said over head product as the bottoms product in the second or light ends extractive distillation zone with the more volatile $C_5$ unsaturates being recovered as an overhead product and with the isoprene being eventually recovered from said bottoms product of said light ends extractive distillation zone as an overhead product from a second stripping zone, the improvement which comprises (a) operating the heavy ends extractive distillation zone with a solvent concentration of from about 5 to about 40 mole percent solvent based on total liquid on the trays in said extractive distillation zone, thereby to recover substantially all of the cyclopentadiene and heavy ends from the $C_5$-fraction in the fat solvent as bottoms product and to recover substantially all of the isoprene and more volatile hydrocarbons as the distillate product; (b) contacting the overhead distillate from the heavy ends extractive distillation zone in a light ends extractive distillation zone with a solvent concentration of from about 70 to about 90 mole percent solvent based on total liquid on the trays in said extractive distillation zone, thereby recovering substantially all of the isoprene in the fat solvent and recovering the more volatile $C_5$ unsaturates as an overhead product; (c) recovering isoprene from said fat solvent in an isoprene stripping zone as the overhead distillate, said stripping zone being operated with a solvent concentration in the upper section of up to 55 mole percent based on total liquid on the trays in said stripping zone, thereby recovering isoprene in high purity as an overhead product and recovering cyclopentadiene at a lower section of the zone where it is removed as a side draw, the stripped solvent being recovered as the bottoms product of the stripping zone; (d) recycling continuously a small portion of the stripped solvent to the heavy ends extractive distillation zone and returning the remainder of the stripped solvent to the light ends extractive distillation zone and the isoprene stripping zone.

2. A process according to claim 1 wherein the fat solvent from the heavy ends extractive distillation zone is introduced into a heavy ends stripping zone to thereby recover solvent with a dimer content of less than 2.0 mole percent in a vapor side draw, cyclopentadiene being recovered as an overhead product from said heavy ends stripping zone, dimer and other heavy ends being recovered in the bottoms product of said heavy ends stripping zone, and the solvent obtained as the vapor side draw from the first or heavy ends stripping zone being returned to the top of the first or heavy ends extractive distillation zone.

3. A process according to claim 1 wherein the cylcopentadiene-containing side draw is introduced into the upper zone of a side draw stripping zone, therein to be stripped of cyclopentadiene by hot vapors obtained from the bottom of the isoprene stripping zone and introduced into the bottom of said side draw stripping zone, cyclopentadiene being recovered as an overhead product from said side draw stripping zone and stripped solvent being recovered as a bottoms product from said side draw stripping zone.

4. A process according to claim 1 wherein the cyclopentadiene-containing side draw is introduced into the upper section of the heavy ends extractive distillation zone.

5. A process according to claim 1 wherein the polar solvent is selected from the group consisting of acetonitrile, acetone, furfural, dimethylformamide, dioxane, phenol and N-methylpyrrolidone and their aqueous admixtures.

6. A process according to claim 3 wherein the polar solvent is aqueous acetonitrile having up to 20 mole percent water.

7. A process according to claim 6 wherein the $C_5$ hydrocarbon mixture is a $C_5$-fraction obtained from a naphtha cracking operation.

* * * * *